No. 11,982. Reissued May 6, 1902.

A. B. DISS.

CASTER.

(Application filed Dec. 13, 1901.)

Witnesses:
J. Stair
Chas. A. Smith

Inventor:
Albert B. Diss
per L. W. Serrell & Son
Attys.

UNITED STATES PATENT OFFICE.

ALBERT B. DISS, OF BROOKLYN, NEW YORK.

CASTER.

SPECIFICATION forming part of Reissued Letters Patent No. 11,982, dated May 6, 1902.

Original No. 654,956, dated July 31, 1900. Application for reissue filed December 13, 1901. Serial No. 85,842.

*To all whom it may concern:*

Be it known that I, ALBERT B. DISS, a citizen of the United States, residing at New York, in the borough of Brooklyn, in the county of Kings and State of New York, have invented an Improvement in Casters, of which the following is a specification.

The object of my present invention is not only to insure the central position of the pintle, but to limit the movement that can be given to the spring-frame heretofore employed and which spans the pintle within the tubular leg and to prevent undue strain upon said spring-frame.

In carrying out my invention I employ a guide-plate surrounding the pintle and above the disk upon which the tubular leg rests. The tubular leg of the bedstead or other article of furniture surrounds and passes over this guide-plate, and the same rests upon the aforesaid disk, and being rigid it maintains the said pintle in a central position to the tubular leg. This guide-plate is perforated at opposite sides of the pintle, and the free ends of the spanning spring-frame are provided with small central tangs passing into the said perforations. When the caster is connected with the tubular leg, the parts of the spring-frame are pressed slightly toward each other and are under tension while in contact with the inner surface of the tubular leg to hold the caster frictionally in place. In this position the aforesaid tangs are free in the openings of the guide-plate; but when the caster is removed from the tubular leg the frame spreads and the tangs come in contact with the guide-plate, and if the parts of the spring-frame are forced toward each other by a strong hand-pressure the holes in the guide-plate act as stops for the tangs to limit this movement and prevent the frame from being so far bent as to injure its spring qualities.

Figure 1:
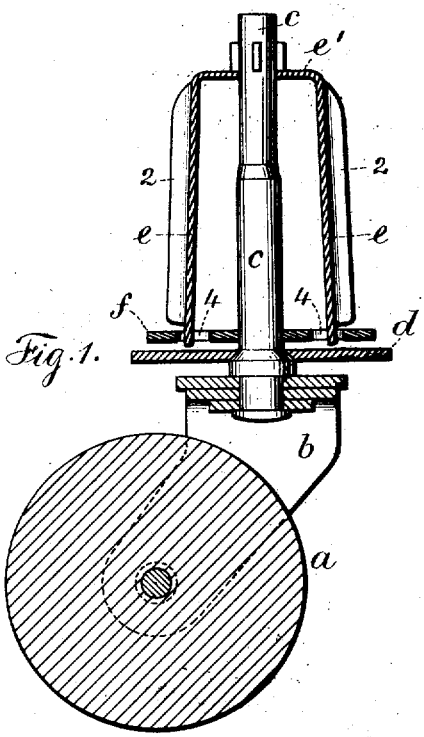
Figure 2:
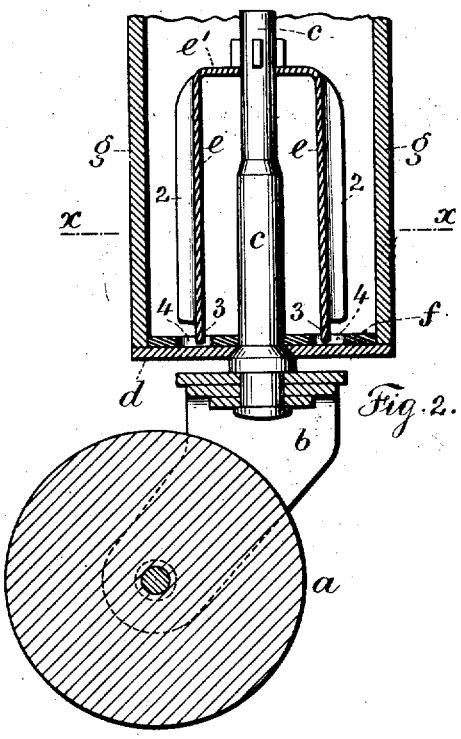
Figure 4:
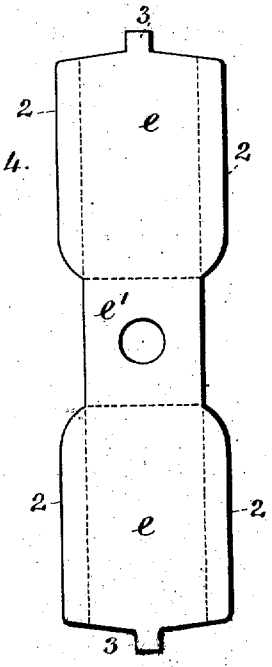
Figure 3:
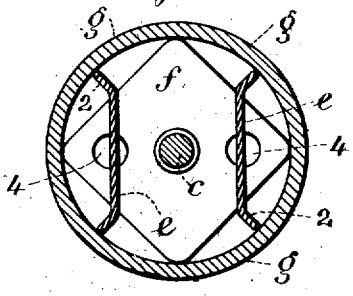

In the drawings, Figure 1 is a vertical section illustrating my invention. Fig. 2 is a similar view showing the caster connected to the tubular leg. Fig. 3 is a cross-section at *x x* of Fig. 2, and Fig. 4 is a plan view of the spring-frame as laid out flat.

The caster-wheel *a*, the jaws *b* therefor, and the pintle *c*, as well as the disk *d*, surrounding the pintle and upon which the tubular leg *g* rests, are all of usual or well-known construction and do not require further description.

The spring-frame *e e*, spanning the pintle within the tubular leg and acting outwardly against the inner surface of the tubular leg to maintain the caster frictionally in place, is provided with a narrow central bridge portion *e'*, having an opening to receive the pintle, and the vertical edges of said spring-frame are outturned, as wings 2, that are radial to the pintle. The said spring-frame is bent on the transverse dotted lines, Fig. 4, to form the inverted-U shape shown in Figs. 1 and 2, and the free ends of the portions *e e* of the spring-frame are provided with tangs 3, that occupy a central position.

A guide-plate *f* surrounds the pintle above the disk *d*, and the same is provided with openings 4, which when the parts are in position receive the tangs 3 and have the effect of limiting the movement which can be given to the parts of the spring-frame. This guide-plate *f* agrees in diameter with the inner diameter of the tubular leg *g*, so that the said tubular leg passes over the said guide-plate when in place and rests at its lower edge upon the surface of the disk *d*.

When the caster is not in position in the tubular leg, the parts *e e* of the spring-frame are spread at their lower ends by the spring action, so that the tangs come against the guide-plate *f*, which guide-plate limits the outward movement of the parts of the spring-frame, and when the caster is in position in the tubular leg, as shown in Fig. 2, the parts of the spring-frame are pressed slightly toward each other under tension to hold the caster frictionally in place in the tubular leg, and in this position the tangs are free in the openings in the guide-plate.

When the caster is not in position in the tubular leg, the guide-plate *f*, with its openings, not only prevents the parts of the spring-frame spreading too far, but also limits the movement of the parts of the spring-frame under pressure toward one another, so as to prevent too great a movement, which would be likely to injure the spring qualities of the frames at the bent union between the parts *e* and the central part *e'*, so that careless handling and testing of the spring-frame by hand cannot injure or change the position of the parts of the spring-frame, the tangs being of sufficient strength as cut from the parts of the spring-frame to withstand any ordinary hand-pressure tending to bring the parts of the frame close together.

I find that it is quite necessary to prevent the parts of the spring-frame being forced toward one another, as in handling samples of casters carelessly one is liable to test the spring-frame by hand-pressure to too great an extent, and so injure the caster.

While the guide-plate *f*, Fig. 3, is shown square in outline, with four points of contact between the same and the inner surface of the tubular leg, the said plate is made of this form for economy of material and convenience rather than circular, which would be more difficult to pass within the tubular leg; but I do not limit myself in any way to the form of this plate.

I claim as my invention—

1. The combination with the caster-wheel, jaws and pintle, of a disk surrounding the pintle and upon which the tubular leg rests, a spring-frame spanning the pintle, fitting within the tubular leg and acting frictionally against the inner surface of the tubular leg to hold the caster in place and prevent the same accidentally dropping out, and means for limiting the compressive movement of the free portion of said frame, substantially as set forth.

2. The combination with the caster-wheel, jaws and pintle, of a disk surrounding the pintle and upon which the tubular leg rests, a spring-frame spanning the pintle and having a hole at its folded portion to receive the pintle near its free end, said frame fitting within the tubular leg and acting frictionally against the inner surface thereof to hold the caster in place and prevent the same accidentally dropping out, and means for limiting the compressive movement of the free portion of said frame, substantially as set forth.

3. The combination with the caster-wheel, jaws and pintle, of a disk surrounding the pintle and upon which the tubular leg rests, a spring-frame spanning the pintle fitting within the tubular leg and acting frictionally against the inner surface of the tubular leg to hold the caster in place and prevent the same accidentally dropping out, means for limiting the compressive movement of the free portion of said frame, and means for insuring the central position of the pintle, substantially as set forth.

4. The combination with the caster-wheel, jaws and pintle, of a disk surrounding the pintle and upon which the tubular leg rests, a spring-frame spanning the pintle and having a hole at its folded portion to receive the pintle near its free end, said frame fitting within the tubular leg and acting frictionally against the inner surface thereof to hold the caster in place and prevent the same accidentally dropping out, means for insuring the central position of the pintle and means for limiting the compressive movement of the free portion of said frame, substantially as set forth.

5. The combination with the caster-wheel, jaws and pintle, a disk surrounding the pintle and upon which the tubular leg rests, and a spring-frame spanning the pintle within the tubular leg and acting outwardly against the inner surface of the tubular leg to maintain the caster frictionally in position, of means for insuring the central position of the pintle and means acting in connection therewith and with the spring-frame for limiting the movement of the spring-frame, substantially as set forth.

6. The combination with the caster-wheel, jaws and pintle, a disk surrounding the pintle and upon which the tubular leg rests, and a spring-frame spanning the pintle within the tubular leg and acting outwardly against the inner surface of the tubular leg to maintain the caster frictionally in position, of a guide-plate surrounding the pintle above the said disk and adapted to pass into the lower end of the tubular leg, said plate having perforations at opposite sides of the pintle and tangs upon the free ends of the spring-frame passing into the perforations of the said plate, substantially as set forth.

7. The combination with the caster-wheel, jaws and pintle and a disk surrounding the pintle and upon which the tubular leg rests, of an inverted-U-shaped spring-frame spanning the pintle within the tubular leg and having a central portion through which the pintle passes and the vertical edges of the frame bent outward as wings and which frame acts outwardly against the inner surface of the tubular leg to maintain the caster frictionally in position, means for insuring the central position of the pintle and means acting in connection therewith and with the spring-frame for limiting the movement of the spring-frame, substantially as set forth.

Signed by me this 5th day of December, 1901.

ALBERT B. DISS.

Witnesses:
GEO. T. PINCKNEY,
S. T. HAVILAND.